May 22, 1962 D. W. McLEOD 3,035,800
CABLE TRAY ACCESSORIES
Filed Nov. 24, 1959 5 Sheets-Sheet 1
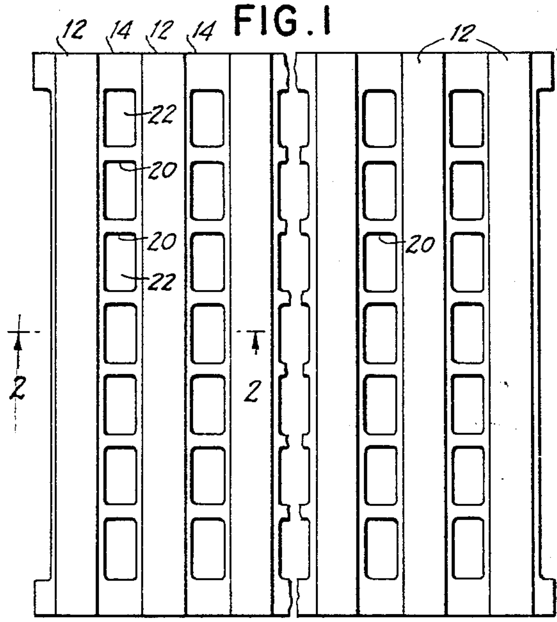
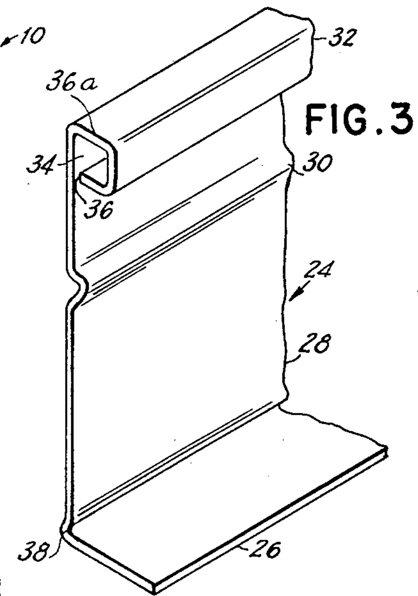
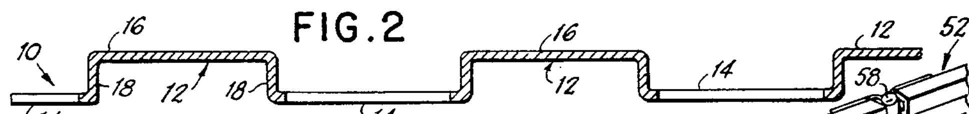
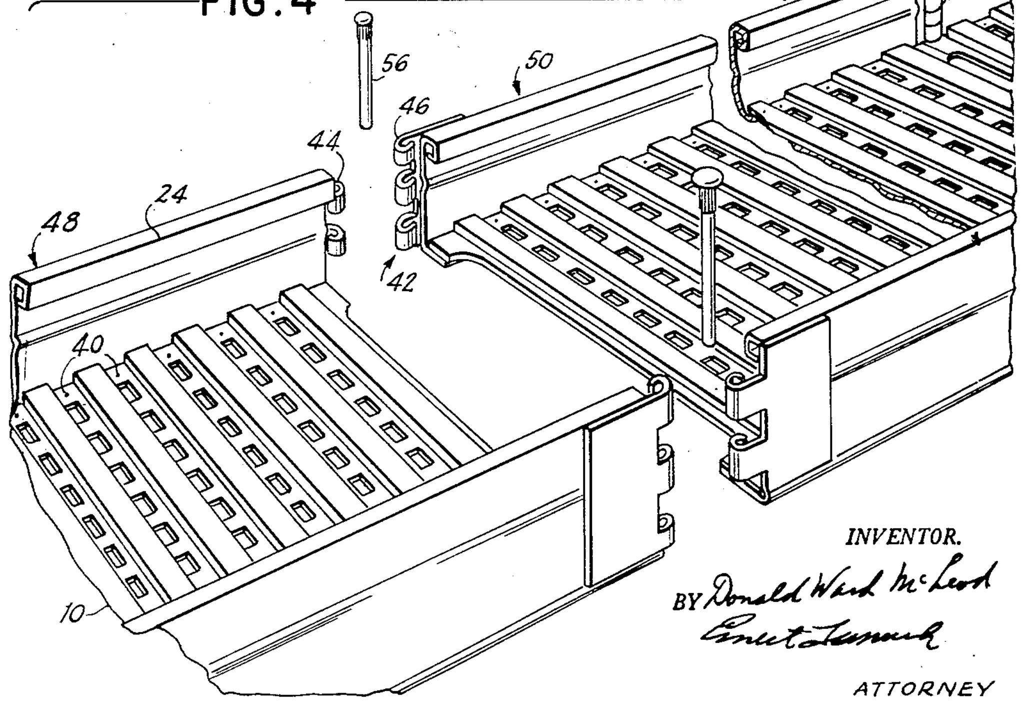
INVENTOR.
BY Donald Ward McLeod
Ernest Lanninck
ATTORNEY

INVENTOR.

BY Donald Ward McLeod

ATTORNEY

May 22, 1962 D. W. McLEOD 3,035,800
CABLE TRAY ACCESSORIES
Filed Nov. 24, 1959 5 Sheets-Sheet 3
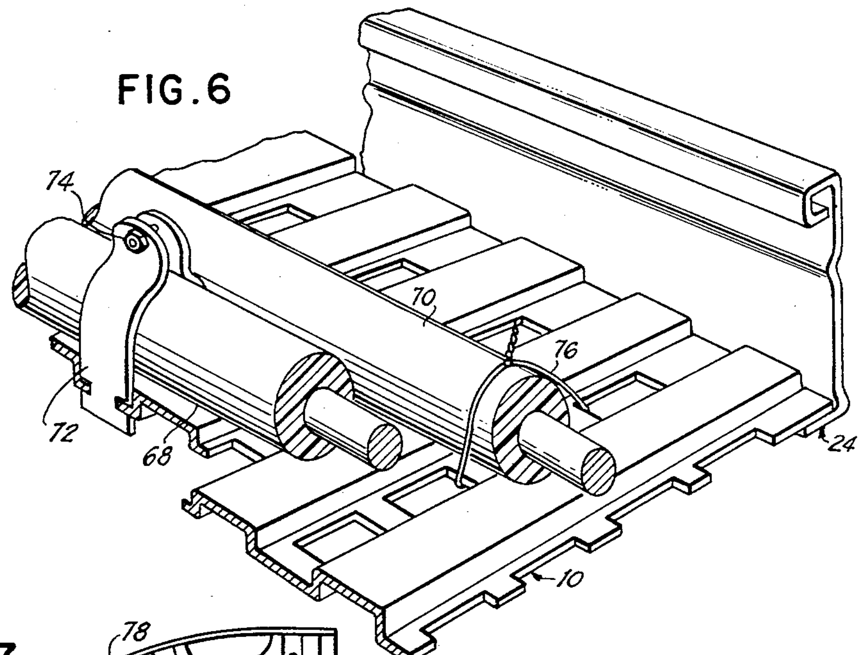
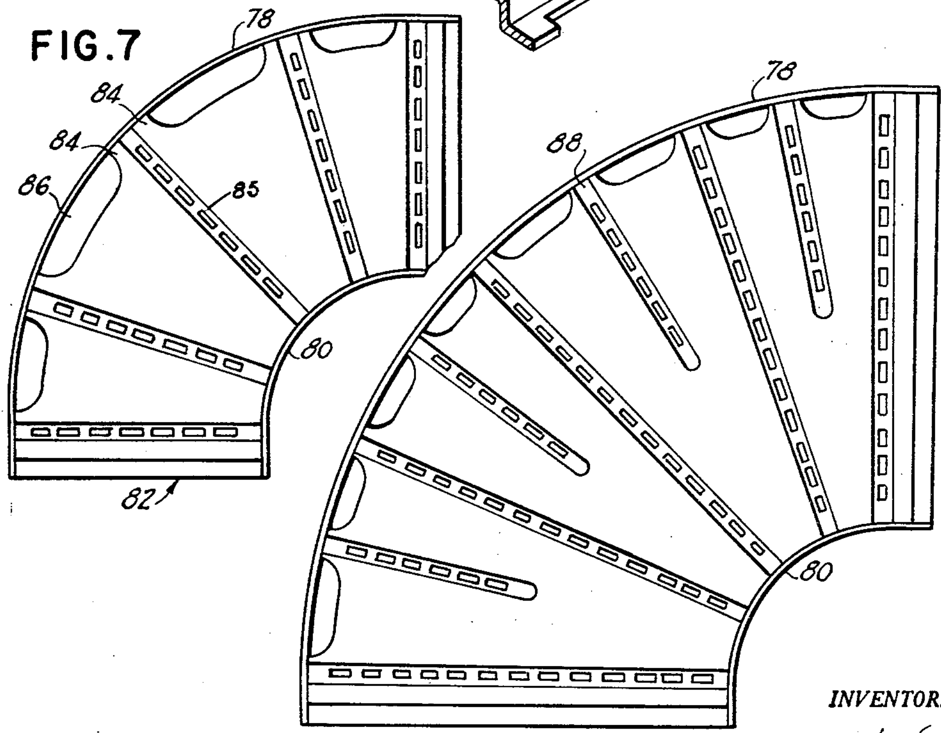
INVENTOR.
BY Donald Ward McLeod
Ernest Fanning
ATTORNEY May 22, 1962 D. W. McLEOD 3,035,800
CABLE TRAY ACCESSORIES
Filed Nov. 24, 1959 5 Sheets-Sheet 4
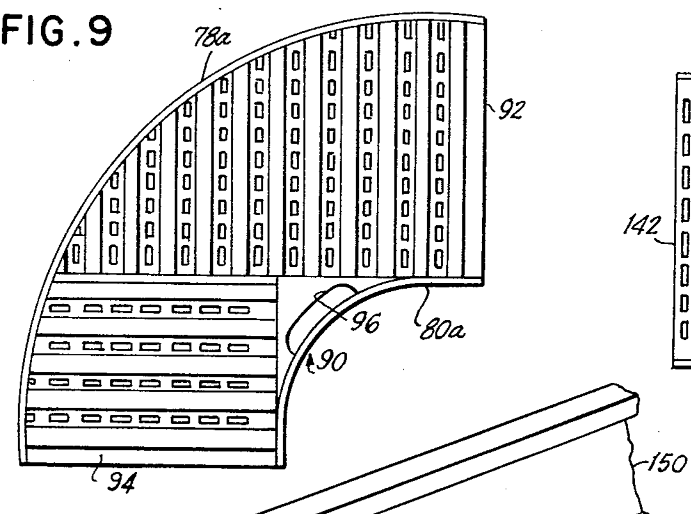
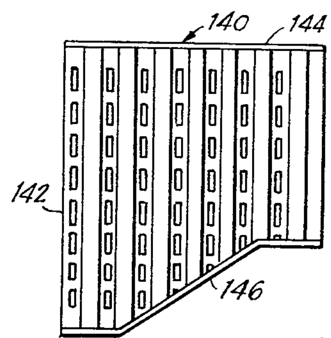
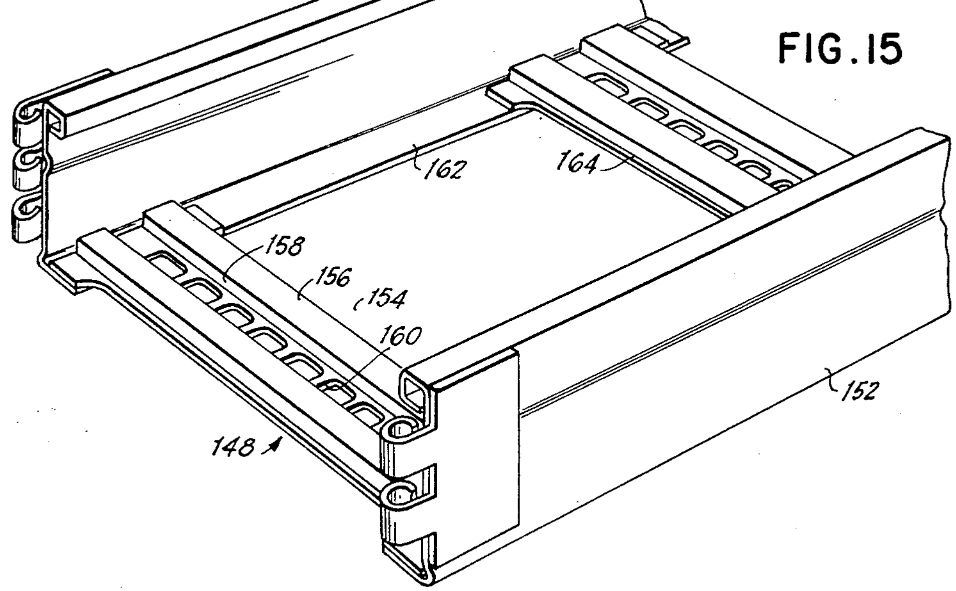
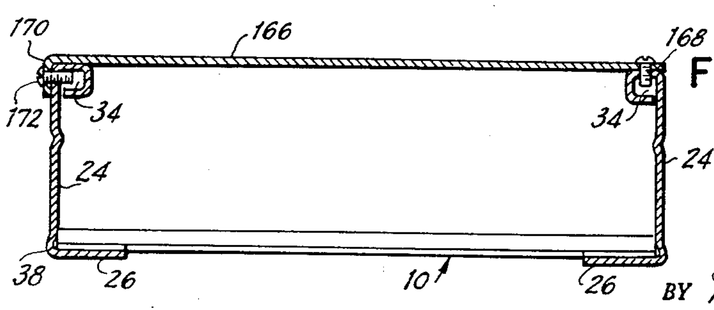
INVENTOR.
BY Donald Ward McLeod
Ernest Lancer
ATTORNEY May 22, 1962 D. W. McLEOD 3,035,800
CABLE TRAY ACCESSORIES
Filed Nov. 24, 1959 5 Sheets-Sheet 5
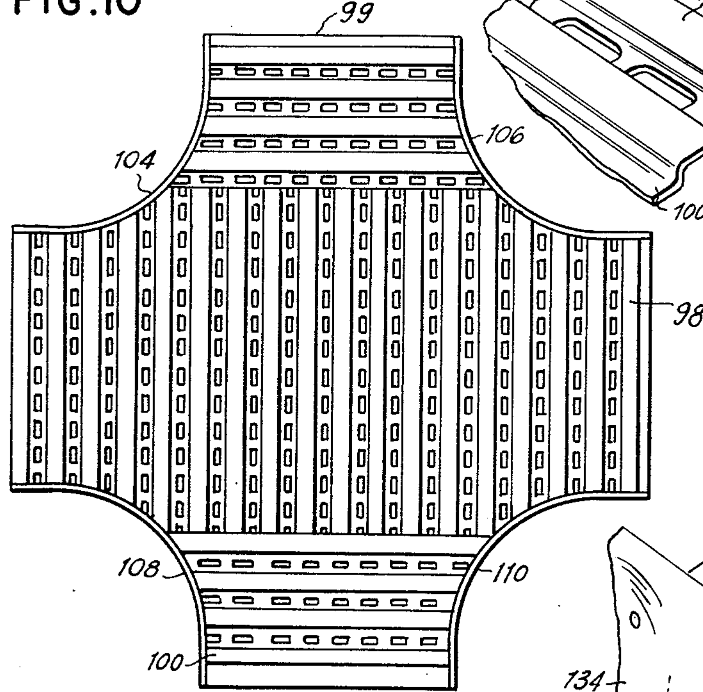
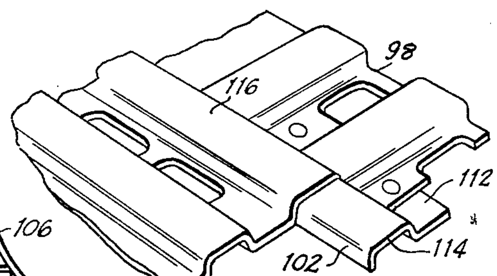
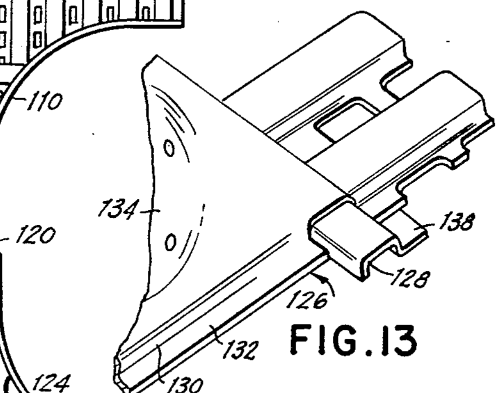
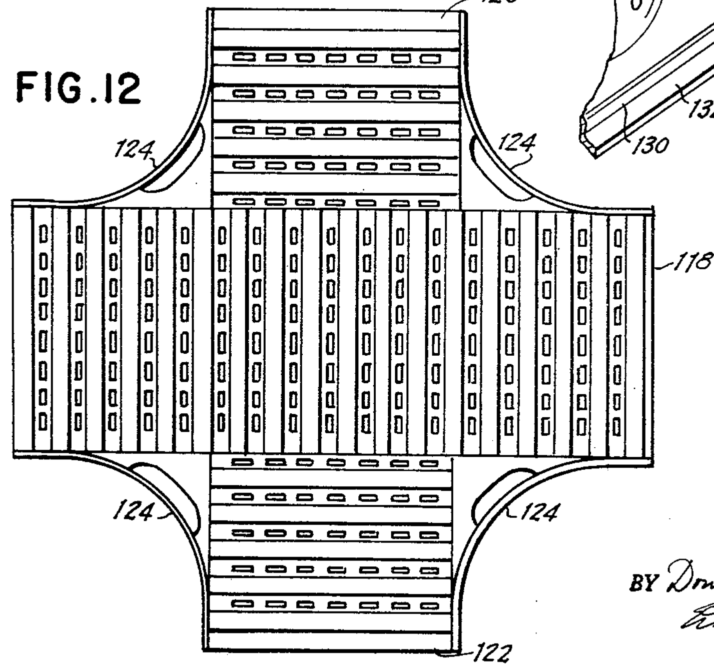
INVENTOR.
BY Donald Ward McLeod
Robert Fanning
ATTORNEY 3,035,800

CABLE TRAY ACCESSORIES

Donald Ward McLeod, Don Mills, Ontario, Canada, assignor to Burndy Corporation, a corporation of New York Filed Nov. 24, 1959, Ser. No. 855,096
2 Claims. (Cl. 248—68)

This invention relates to accessories for interjoining supporting tray units and, more particularly, to the accessories for interjoining cable or pipe tray units to form a unitary supporting trough system.

Cable and pipe supporting trough systems are extensively used in power stations and large industrial plants to support a plurality of cables or wires for the transmission of electrical energy and for the support of piping or tubing used in the transmission of fluids both liquid and gaseous. Usually, a plurality of prefabricated channel or tray units are assembled at the plant location to form the supporting trough system.

In the past the prefabricated cable tray units have generally been one of two forms. The first type may be designated as a "mesh" channel unit. Such mesh units included a bottom for the trough which was usually manufactured of expanded sheet metal. The expanded metal bottom was joined along its longitudinal edges to channel supports or side rails. In one embodiment of this type of mesh channel unit, the expanded metal bottom had its edges upturned to provide side walls for the trough. The upstanding edges of the expanded metal were finished off by attaching a sheet metal binder strip to the edges of the wall in order to present a smooth lip which would not cut into the cable.

The second type of channel unit may be designated "punched sheet metal" type channel unit. The channel unit of this known type was generally formed of a single sheet of metal in which the sides of the trough unit were constructed by forming or bending the two opposite portions of the sheet metal bottom to form the upstanding walls. Transverse slits were punched in the bottom of the unit intermediate the wall portion and the edges of the slots were downwardly extruded to provide a rounded lip for each of the slits.

The mesh type of channel unit provided a substantial air flow through the openings in the bottom and the slits in the punched sheet metal type provided a similar but somewhat lesser flow of air. The mesh unit was difficult to interconnect to other units while the downward turned edges of the slits in the punched sheet metal type often interfered with the easy support of the trough system. Both types of units required a relatively heavy gauge of metal to be used in order to support the weight of the cable and piping carried by the system and to allow for a proper margin of safety in the event that workmen used a trough as a catwalk during construction of the plant or building in which it was installed. In addition, the required heavy metal gauge made the prefabricated unit quite heavy and awkward to handle during installation.

In certain locations it is necessary to install covers for the trough unit to prevent the accidental dropping of tools or contaminating material into the trough. The attachment of covers to either of the known type of trough units was difficult. Moreover, it has been found desirable in certain cases to clamp or lash the cable or piping to the trough to prevent undesired movement.

In these known types of cable tray systems accessories have been designed to interconnect the various units. However, in general, these accessories have been of a different design than the basic tray units.

One type of cable tray unit described in copending application Number 828,638 comprises a bottom and two longitudinally extending supporting channels. The bottom of the tray comprises a ribbed floor having alternating ridges and grooves. The ridges extend the full transverse width between the side channels to provide additional strength to the floor as a result of this "beam effect." The grooves between the ridges include a plurality of cutouts or holes intermediate the side channels to provide for vertical air flow and for the clamping or lashing of the wires, cables or pipes to the tray unit.

The supporting channel side elements include formed stiffening rib elements which longitudinally extend the length of the tray to provide additional strength in the longitudinal direction. The side rails include folded over or formed top elements to materially increase the strength and to protect the ends of screws utilized in attaching covers to the tray element.

One of the objects of the present invention is to provide accessory units for interjoining sections of cable tray units to provide a cable or pipe supporting system.

Another object of this invention is to provide means for changing the direction of a supporting tray system.

Still another object of this invention is to provide new and novel accessory for joining supporting tray units wherein the accessory provides for both a transverse and vertical air circulation around the supported elements.

Further objects of this invention provide for the ease of attaching cables or pipes to the accessories of the tray structure; for the ease of supporting of the assembled system; and in general, to provide all the advantages of the supporting tray system to the accessory units.

According to the present invention, an accessory for changing the direction of the tray system for use where the units of the tray system includes longitudinally extending supporting members and a plurality of ridged beam members joined at each end to the supporting member comprises an extension of the supporting member provided with a flange, a ridged connecting member having the ridge nesting in the ridge of the transverse beam member and provided with a flanged portion which supports the beam members to the tray unit and means for supporting the connecting beam in the extension of the supporting member.

The above-mentioned and other features and objects of the invention will become more apparent by reference to the following description taken in conjunction with the accompanying drawings, in which:

FIG. 1 is a plan view of the ribbed bottom for use in the cable tray system accessories of this invention;

FIG. 2 is a cross-sectional view of the ribbed bottom taken along lines 2—2 of FIG. 1;

FIG. 3 is a perspective view of the side rail for use in the cable tray system;

FIG. 4 is a perspective view of the cable tray units assembled to form a cable tray system in accordance with the principles of this invention;

FIG. 6 is a perspective view partly in section showing the means for joining the cables to the cable tray units;

FIGS. 7 and 8 are various embodiments of bent section units for use in conjunction with the cable tray units;

FIGS. 9 and 10 are embodiments of cable tray accessories for use in assembling a cable tray system;

FIG. 11 is a partial view in perspective of the supporting element for use in the cross-connector of FIG. 10;

FIG. 12 is an alternate embodiment of a cross connector for use in a cable trough system;

FIG. 13 is a perspective view partly in section of a corner support for use with the cable tray accessories of this invention;

FIG. 14 is a plan view of a reducer section for use with the cable tray system;

FIG. 15 is a perspective view of a ladder type cable trough in accordance with the principles of this invention; and FIG. 16 is a cross-sectional view of the cable trough unit of this invention with a cover attached.

Figure 5:
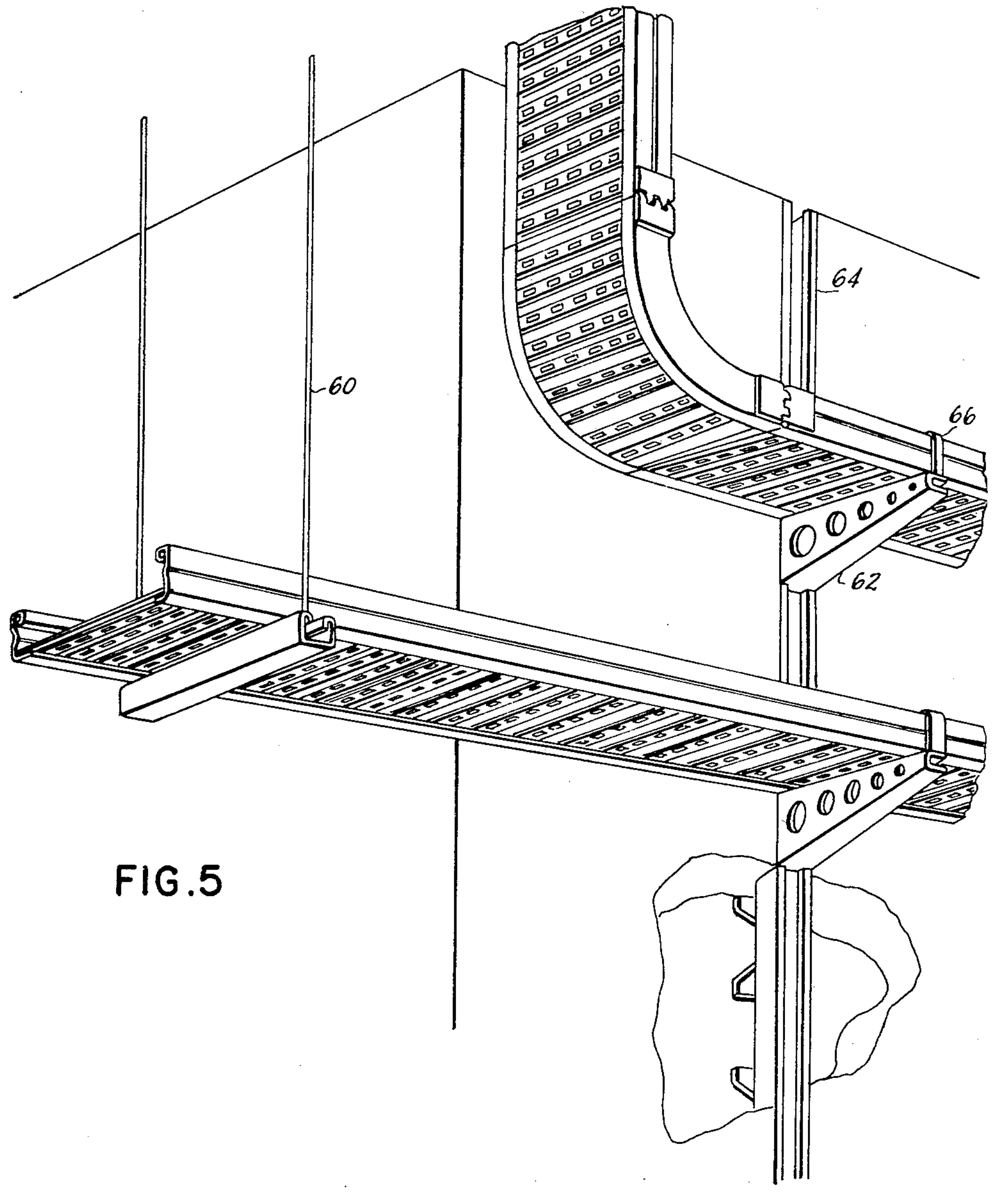
FIG. 5 is a perspective view of part of a cable tray system.

Referring to FIGS. 1 and 2 of the drawing, a cable tray bottom member 10 for use in the cable tray unit or accessory of this invention is therein shown to comprise a plurality of alternating ridges 12 and grooves 14. Each ridge 12 had a flat floor section 16 adjoining the vertically depending side flanges 18. The ridge sections 12 extend the full width of the bottom 10. The groove section 14 joins the bottom of the vertically depending flanges 18 of the ridge 12. A plurality of spaced connecting strips 20 join the depending flanges 18 to form a plurality of openings or holes 22 which may be punched out of or otherwise formed in the grooves 14 to fashion the connecting strips 20. The connecting strips 20 provide additional support against transverse forces.

Referring to FIG. 3 of the drawing, one of the side rails 24 for use in the cable tray unit is therein shown to comprise a rolled sheet form having a supporting lip 26 and a vertical side wall 28. The vertical side wall 28 has a longitudinally extending integral stiffening rib 30 formed therein to provide a beam effect which materially assists in resisting deformation in an axis perpendicular to the longitudinally extending axis of the side rail 24. The upper portion of the vertical side wall 28 is turned in on itself and folded over to provide a finished edge 32 having a longitudinally extending hollow of rectangular cross-section 34. The end 36 of the side rail 24 is formed in such a manner that it is slightly spaced apart from the vertical side wall 28. Such spacing permits complete galvanizing or otherwise plating to protect the entire side rail 24 against corrosion. However, when forces due to the weight of the cables or pipes supported are applied to the lip 26, the slight opening between end 36 and wall 28 tends to close, providing additional resistance to deflection of the side rail 24. An additional stiffening rib 38 is formed where the lip 26 meets the vertical wall 28. The combination of the folded over end 32 and the stiffening ribs 30 and 38 provide a strengthening section modulus which, combined with the ribbed flooring provides great rigidity, both longitudinally and transversely.

Referring to FIG. 4 of the drawing, the assembled cable tray of my invention is therein shown to comprise a pair of side rails 24 similar to those illustrated in FIG. 3 and a bottom member 10 as shown in FIG. 1 which is integrally joined to the lips 26 of the side rails 24 by means of spot welding in the groove margins as shown by reference numeral 40 or otherwise attaching the ribbed bottom 10 to the side rails 24. Each supporting tray unit is terminated by coupling means 42 so that they may be easily assembled to form continuous length of tray.

The coupling means illustrated comprises mating hinge elements 44 and 46 attached to the ends of the side rails 24 of each trough unit 28, 50, and 52. The mating hinge units 44 and 46 are positioned in such a manner as to cause their coupling elements 54 to interleave and a coupling pin is inserted to join the side rail ends as shown at 58. It is, of course, obvious that other coupling means can be utilized to join the cable tray units.

The ribbed floor 10 of the tray units with its plurality of ridges 12 extending between the side rails 24 act as beam members providing a maximum resistance to transverse deflection, giving a maximum strength to the entire unit. The stiffening ribs 30 and 38 in addition to the folded over portion **36*a*** of the side rails provide rigidity along the longitudinal axis of the unit. Due to the additional strength provided, the supporting trough of my invention has equal or better strength when compared to the prior art units. For example, in order to support 100 pounds per foot of pipe or cable plus a workman on a 24 inch wide trough, the prior art units found that it was necessary to use a 14 gauge metal in forming the trough. The supporting trough of this invention can support the same load by using 20 gauge metal for the bottom with 16 gauge material for the side rails. In general, the prior art devices having a mesh bottom were approximately 15% heavier than the cable tray of this invention. This lighter weight makes this trough easier to install, more economical and allows it to be supplied in longer lengths than the prior art units.

Again referring to FIG. 4, it is seen that units 48 and 50 may be joined without the use of any joiner strip. The unique design of the ribbed bottom 10 permits the tray units to be cut along a groove 14. Since the pipe or cable rests on the floor 16 of the ridges 12, the supported elements do not come in contact with the cut edge and this eliminates the danger of damaging the cable insulation eliminating the need for a joiner strip.

As shown in FIG. 5, the assembled tray units may be supported by means of a hanger fixture 60 of the trapeze type depending from an overhead support. Since no portion of the tray extends below the lips 26 of the side rails 24, an even undersurface is achieved which allows ease in supporting the unit. Alternately, the tray units may be supported by a cantilever beam 62 supported by an insert 64 mounted to the vertical wall. The cantilever beam 62 is terminated by an upstanding lip 66 engaging the side wall 28 and end 32 of the rail 24 and preventing inadvertant lateral movement of the tray units.

Referring to FIG. 6, there is therein shown various means for attaching the pipe or cable 68 and 70 to the tray bottom 10. The supported pipes or cable 68 and 70 rests on the elevated portion 16 of the ridges 12 formed in the ribbed floor 10. A cable clamp 72 of standard size and shape may be inserted in the openings 22 formed in the grooves 14 on the ribbed floor 10. The nut and bolt 74 of the cable clamp 72 are tightened to firmly grasp the cable 68 and resist movement transverse to the axis of the tray. Preferably, the clamp 72 is made of nonmagnetic material. Alternately, the cable or pipe may be lashed to the connecting members of the grooves by means of a cord or wire 76. Thus, the cables may be attached either to the opening 22 or to the connecting strips 20 as is deemed most desirable for the particular application. It is also apparent from FIG. 6 that vertical air circulation is provided through the openings 22 in the ribbed bottom 10 and around the cables by air flow to the grooves 14. These mutually perpendicular air currents tend to provide adequate cooling for the cable.

In order to provide accessory units for the cable tray system so that they may be formed into a system, various accessories are shown in FIGS. 7–14.

FIG. 7 illustrates one method of providing a bend to join two straight tray units to change the axial direction of the system. The bend of FIG. 7 is formed of two curved side rails 78 and 80 and a ribbed bottom 82. The bottom unit 82 is formed of wedge shaped ridges 84 and radially extending grooves 85. The width of the grooves 85 is maintained constant so that the same punch equipment utilized to form the grooves in flooring of FIG. 7, and so that the same clamping means may be used in the straight sections and on the accessories. The sheet metal bottom 82 is placed under the punch to form the first groove and the material is then rotated and moved to form the successive grooves in the bend. The bottom 82 is integrally joined to the side rails to form the bend. In order to provide for ease of attachment the wedges are formed with a depressed portion 86 where additional spot welding is utilized to form a more rigid unit. It has been found where the width of the bend is increased, additional air flow is advantageous. In order to provide this additional air flow auxiliary radial grooves 88 are formed in the wedge-shaped ridges of the bend. These auxiliary radial grooves 88 do not extend the full length of the floor but are incorporated in the width portion of the wedge shaped ridges. It is, of course, realized that whereas the bends illustrated have their inner and outer side rails curved about a common center, it is equally possible to form these side rails with a common radius so that the curves or bends will smoothly fit together in a horizontal plane.

Referring to FIG. 9 of the drawing, an embodiment of a bend 90 is therein shown to comprise a plurality of straight section rib floors 92 and 94 which have been cut to form the bend 90. A corner brace 96 similar to the brace illustrated in FIG. 13 and hereinafter described is utilized to provide the support between the inner side rail **78*a* and the straight sections 92 and 94** of the ribbed flooring.

Referring to FIG. 10, one embodiment of a cross-connection is therein shown to comprise a plurality of straight ribbed flooring sections 98, 99, and 100 which have had their corners removed and are supported by a brace 102 similar to that shown in FIG. 11. The brace 102 is joined at its ends to the lips of the paired rails 104, 106, and 108, 110, and provides a supporting lip 112 to which the ends of the straight ribbed floor bottoms 98 and 100 are joined. The lip 112 of the supporting brace 102 is integrally formed with a reinforcing ridge or beam section 114 which fits under the end ridge 116 of the ribbed flooring section 100 while the lip 112 supports the end of flooring sections 98.

Alternately, straight sections of ribbed flooring 118, 120, 122 may be utilized to form a cross connector such as illustrated in FIG. 12 which is composed of the ribbed flooring section, four curved side rails 124 are joined at their outer extremities to the straight ribbed floor sections and corner brace 126 such as illustrated in FIG. 13. The corner brace 126 used in conjunction with ribbed flooring sections includes a supporting beam 128 and a corner 130. The corner 130 formed with a lip 132 which is utilized to support the side of straight section 120 in FIG. 12 or the edge of straight section 94 in FIG. 9. The depressed portion 134 of the corner 130 is spot welded to the lip of the inner side rail. A support member 128 has its ends joined to the lips of the side rail and supports the corner 130. The lips 138 of the support member are utilized to support the edges of the straight ribbed floor section 118. Thus the floor sections are supported on the lips 132 and 138 of the corner brace member 126.

Thus, it is seen that these accessories which have been provided contain all the structural advantages of the tray units and provide for continuity of design.

FIG. 14 illustrates one embodiment of a reducer section 140 for joining wide and narrow straight trough sections. The reducer section is composed of a ribbed floor section 142 cut to the desired width and one straight rail section 144 and a bent rail section 146. The rail sections 144 and 146 are similar to the rail illustrated in FIG. 3 and the rolled bottom 142 is joined thereto.

Referring to FIG. 15 an embodiment of a ladder type cable trough 148 is therein seen to comprise a pair of side rails 150 and 152 similar to the side rails illustrated in FIG. 3 integrally joined by a plurality of spaced bracing ladder rungs 154. Each ladder rung 154 is ribbed or corrugated to form a plurality of beam units having flat floor sections 156 joining depending flanges 158. A plurality of interconnecting strips 160 join the bottom edges of the depending flanges 158 of the rungs 154 to form the groove sections. The rungs 154 are integrally joined to the lips 162 of the side rails 150 and 152 to form a continuous ladder structure.

Due to the beam effect of the rungs 154 and the stiffened side rails 150 and 152 the unit illustrated in FIG. 15 achieves substantial rigidity against vertical and transverse deflection.

Referring to FIG. 16, it is often desirable to append a cover to the cable tray of this invention. Since the edges 164 of the side rails are folded over to provide a flat top surface enclosing a protected hollow section, it is merely necessary to place a sheet metal cover 166 extending between the folded over edges 164 and use sheet metal screws 168 to join the cover 166 to the side rails. The ends of the screw 168 are disposed within the hollow of the folded edges and are thus prevented from damaging the cables inadvertently. Alternately the cover may be formed with a lip 170 and the screw 172 inserted from the side.

I have thus described my invention, but I desire it understood that it is not confined to the particular forms or uses shown and described, the same being merely illustrative, and that the invention may be carried out in other ways without departing from the spirit of my invention, and therefore, I claim broadly the right to employ all equivalent instrumentalities coming within the scope of the appended claims, and by means of which, objects of my invention are attained and new results accomplished, as it is obvious that the particular embodiments herein shown and described are only some of the many that can be employed to attain these objects and accomplish these results.

I claim:

1. In a supporting trough system having a pair of spaced apart, longitudinally extending side rails, each rail comprising a vertical member and a horizontal member; a plurality of longitudinally spaced apart transverse beams interconnecting said pair of side rails; said plurality of beams each comprising a pair of vertical members and an upper horizontal member joining the upper edges of said pair of vertical members; a plurality of lower horizontal members connecting the lower edges of the vertical members of adjacent transverse beams; each of said lower horizontal members overlapping the horizontal rail portion and attached thereto; means for changing the direction of the supporting trough system comprising an extension of one said side rails provided with a vertical member and a horizontal member; a reinforcing ridge having a pair of vertical members and an upper horizontal member joining said pair of vertical members and a lower horizontal member attached to the lower end of one of said reinforcing ridge vertical members and connected to the horizontal member of said side rail extension; said reinforcing ridge vertical members and upper horizontal member adapted to nest within one of said transverse beams; the lower horizontal member of said reinforcing ridge member supporting a plurality of the lower horizontal members interconnecting a plurality of transverse beams disposed at right angles to said reinforcing ridge.

2. In the supporting trough system of claim 1 wherein said side rail extension is curved, a brace resting on the horizontal member of said side rail extension; said brace having a portion nesting with the pair of vertical members and upper horizontal member of said reinforcing ridge.

References Cited in the file of this patent

UNITED STATES PATENTS

| | | |
|---|---|---|
| 2,662,709 | Ullberg | Dec. 15, 1953 |
| 2,828,046 | Weinman | Mar. 25, 1958 |
| 2,917,259 | Hill | Dec. 15, 1959 |